United States Patent [19]

Salzman

[11] Patent Number: 4,930,883
[45] Date of Patent: Jun. 5, 1990

[54] PHOTOVISUAL STAR DIAGONAL

[76] Inventor: Ronald H. Salzman, 250-D Brennan St., Manchester, N.H. 03103

[21] Appl. No.: 299,889

[22] Filed: Jan. 19, 1989

Related U.S. Application Data

[63] Continuation of Ser. No. 69,861, Jul. 6, 1987, abandoned.

[51] Int. Cl.$^5$ .......................... G02B 7/20; G02B 7/18; G02B 23/02; G02B 23/16
[52] U.S. Cl. .................................. 350/574; 350/632; 350/502; 350/557
[58] Field of Search ............... 350/502, 511, 513, 537, 350/632, 574, 577, 526, 319, 557; 354/79, 155; 248/478, 479; 358/18, 45

[56] References Cited

U.S. PATENT DOCUMENTS

| | | | |
|---|---|---|---|
| 2,614,454 | 10/1952 | Steffen | 350/502 |
| 2,974,573 | 3/1961 | Faasch | 350/502 |
| 3,008,396 | 11/1961 | Mito | 350/502 |
| 3,124,682 | 3/1964 | Kojima et al. | 350/513 |
| 4,053,912 | 10/1977 | Okuna et al. | 354/155 |
| 4,143,938 | 3/1979 | Feinbloom | 350/502 |

*Primary Examiner*—Jon W. Henry
*Attorney, Agent, or Firm*—Leonard D. Schappert

[57] ABSTRACT

A photovisual star diagonal is provided for use with telescopes and cameras to simplify astrophotography, including a tiltable, lockable mirror for providing alternative visual paths for viewing and/or photography.

1 Claim, 4 Drawing Sheets

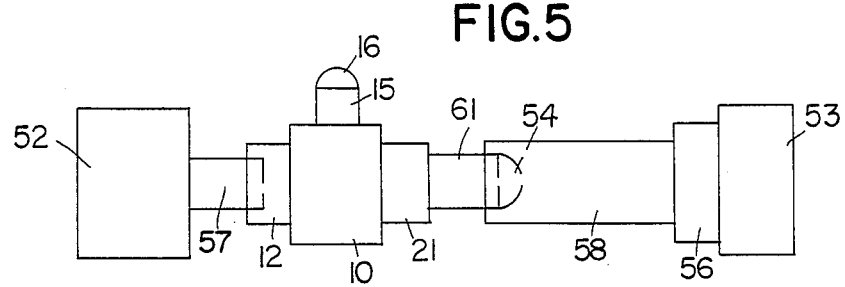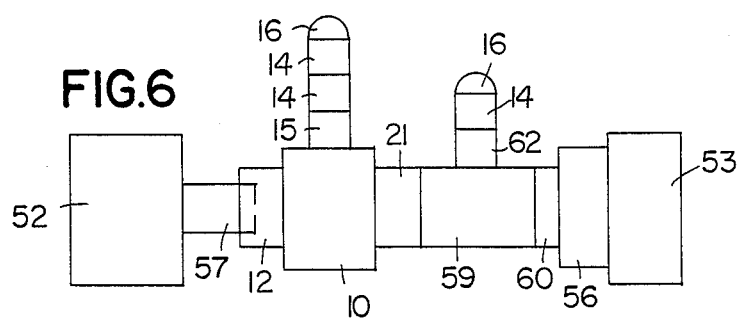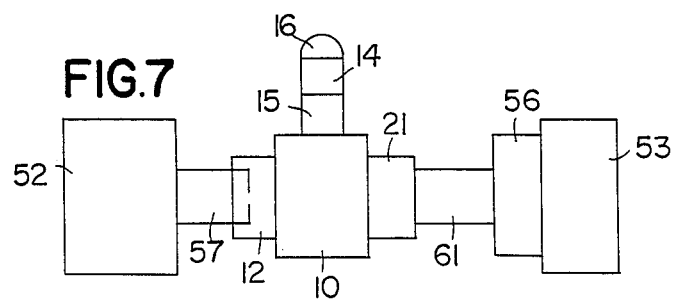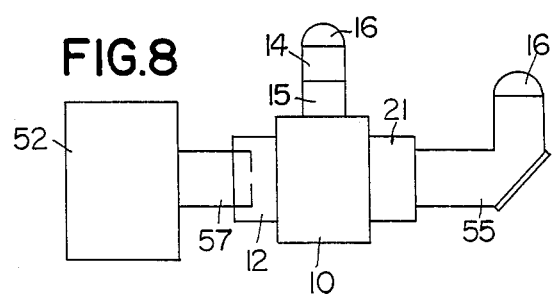

PHOTOVISUAL STAR DIAGONAL

This is a continuation of application Ser. No. 07/069,861, filed July 6, 1987, now abandoned.

BACKGROUND OF THE INVENTION

1. Field of the Invention.

The present invention relates generally to optical equipment, and more specifically to optical equipment for use in attaching a camera to a telescope for use in astrophotography which includes an alternative sighting path to provide for viewing of an object and fine focusing without disturbance to the camera once the system is properly focused for images (parfocalized).

2. Description of the Prior Art.

Previous inventors of optical equipment have directed their efforts toward such devices as a microscope adapter to which a camera mounts which have included a mirror providing adjustment through an auxiliary viewing apparatus, supplementary optical systems for cameras which allow the use of multiple lenses without removal of the normal or regular lens of the camera, and telescopic gun sights having a provision whereby a camera utilizing an alternative viewing path to the path utilized by the individual sighting a gun can be mounted on the telescopic gun sight and adjusted to take photographs of the subject matter within the gun sight. While the prior art of which applicant is aware has been directed toward optical devices some of which provide alternative viewing paths through the use of mirrors or split-image reflective arrangements, none of the art of which applicant is aware has taught the unique combination as taught by the present invention.

SUMMARY OF THE INVENTION

The present invention consists of a photovisual star diagonal for use with telescopes and cameras to simplify astrophotography. "Camera" for purposes of this application refers to a camera body without the lens normally attached thereto. The present invention includes a body, together with couplings for connecting it to telescopes, cameras and other photographic and telescopic accessories. It further includes a tiltable, lockable flat mirror which in one position provides viewing along a first viewing path and, when locked in another position diagonal to the first viewing path, allows viewing along a second viewing path. Couplings are provided for connecting the photovisual star diagonal to a telescope and to a camera, as well as extension tubes and couplings so that one of the viewing paths may be used for a camera for photography while the other viewing path is utilized for purposes of viewing. Thus, once a camera is properly focused, one need only focus the viewing path unused by the camera in order to be able to sight objects to be photographed. Such provision eliminates the need for removing the camera to sight the telescope or sighting through the camera lens itself.

One of the objects of the present invention is to provide a photovisual star diagonal which includes means for attachment to a camera and to a telescope, and also includes means for providing an alternative viewing path, thereby allowing refocusing of the telescope without disturbance to the camera.

Another object of the present invention is to provide a photovisual star diagonal in which the alternative viewing path provided to sight the telescope does not interfere with the use of the camera during photography.

A further object of the present invention is to provide a photovisual star diagonal which includes a mirror which can be positioned diagonally with respect to the optical axis of the telescope to which the photovisual star diagonal is attached in order to establish a visual path through the telescope from an ocular positioned substantially perpendicularly to the optical axis of the telescope.

The foregoing objects, as well as other objects and benefits of the present invention, are made more apparent by the descriptions and claims which follow.

BRIEF DESCRIPTION OF THE DRAWINGS

FIG. 5 is a block diagram showing the photovisual star diagonal positioned between the telescope and a camera for positive projection FIG. 6 is a block diagram of the photovisual star diagonal in position with a telescope attached to one end and a guider, compressor and camera attached to the other end.

FIG. 7 is a block diagram of the photovisual star diagonal attached between a telescope and a camera arranged for prime focus.

FIG. 8 is a block diagram showing the photovisual star diagonal positioned between a telescope and a star diagonal to provide dual-power viewing.

DESCRIPTION OF THE PREFERRED EMBODIMENT

The photovisual star diagonal taught herein is an accessory to be used with telescopes to simplify astrophotography.

Figure 1:
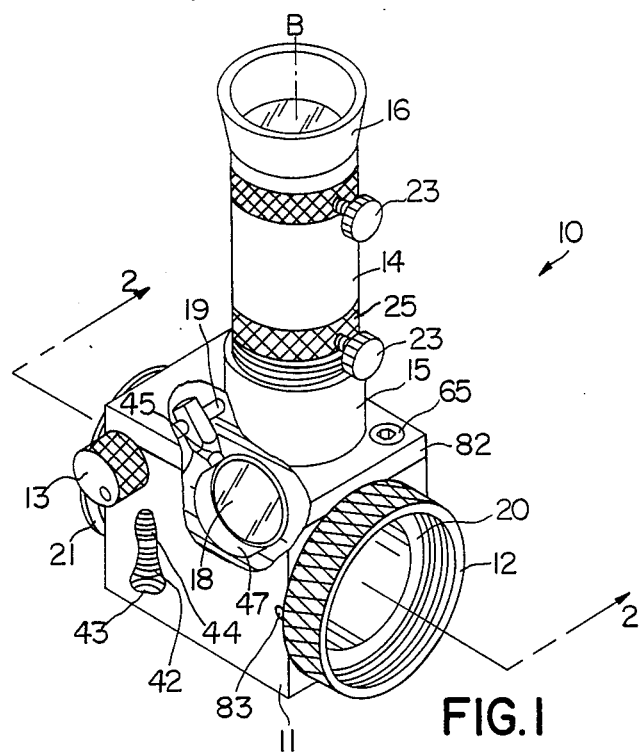
FIG. 1 is a perspective view of the photovisual star diagonal with cutaways showing part of the internal structure thereof.

FIG. 1 of the drawings shows a perspective view of the photovisual star diagonal 10 illustrating its construction. The photovisual star diagonal 10 consists of a body 11 with a top 82 attached thereto by attaching means such as screws 65 to form a compact unit. The body 11 has a cavity therein which is illustrated in greater detail in FIG. 2 of the drawings. The photovisual star diagonal 10 includes a coupling 15 extending upward from the top 82. It further includes one or more extension tubes 14 and a focus tube 25 which adjusts to provide proper focusing for parfocalization; that is, matching the focusing of the ocular 16 to a camera attached to photovisual star diagonal 10 at connector 21. Locking screws 23 are provided to lock the position of extension tube 14 with respect to focusing tube 25 and to lock ocular 16 into position with respect to extension tube 14 or focusing tube 25 where no extension tube 14 is utilized. A tiltable mirror 18 is provided so that, when the tiltable mirror 18 is in an "up" position substantially against the top 82 of photovisual star diagonal 10, the line of view through a camera attached to adapter 21, through body 11 and through coupling 12 is substantially unimpaired. Tiltable mirror 18 is mounted on a mirror holder 47, attached to a connector 45, which may be constructed of metal, plastic or any other acceptable and sufficiently strong material. Connector 45 is attached to rod 19, which is attached to a knob 13. When knob 13 is turned, the position of tiltable mirror 18 can be changed from an "up" position to a "down" position or vice versa. The body 11 of photovisual star diagonal 10 is cut away to show threaded hole 43 with a set screw 42 and spring 44 positioned therein. Set screw 42 and spring 44 are utilized to exert pressure against the mechanism which operates tiltable mirror 18 to secure tiltable mirror 18 in either an "up" or a "down" position.

Figure 2:
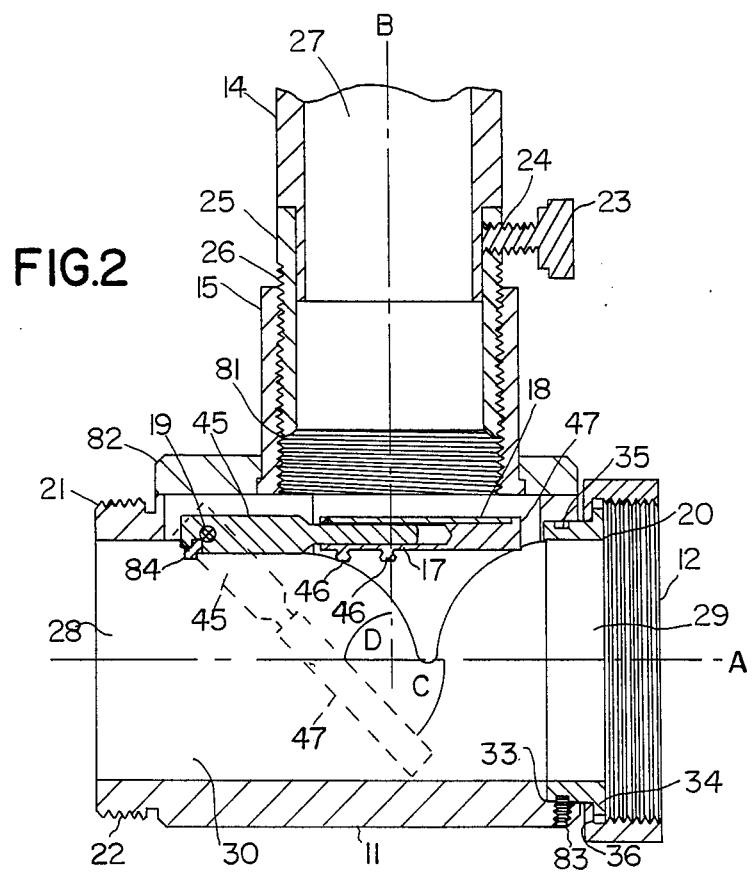
FIG. 2 is a cross-sectional view of the photovisual star diagonal taken along lines 2—2 of FIG. 1.

FIG. 2 is a cross-sectional view of photovisual star diagonal 10 taken along lines 2—2 of FIG. 1 and showing the internal structure of the unit. Body 11 has a substantially cylindrical cavity 30 extending therethrough from adapter 21 to coupling 12 along axis A. Top 82 has a substantially cylindrical cavity 27 extending therethrough along a substantially vertical axis B and intersecting axis A at an angle D of substantially 90 degrees. A coupling 15 is attached to top 82 and includes threads 81 which mate with threads 26 of focusing tube 25, thereby facilitating fine adjustment of the distance between the end of focusing tube 25 and axis A. This provides for fine focusing with respect to tiltable mirror 18. A substantially cylindrical extension tube 14 is positioned and adapted to be held in place with respect to focusing tube 25 by locking screw 23. Locking screw 23 is threaded through threaded hole 24 in focusing tube 25. An ocular 16, shown in FIG. 1 of the drawings, can be slid into the interior of extension tube 14. Body 11 is provided with an adapter 21 having threads 22 provided to facilitate attachment to other optical equipment as shown in FIGS. 5 through 11 of the drawings, and has provision for attachment of a threaded telescope coupling 12 to its opposite end to allow for attachment of a telescope thereto. Threaded telescope coupling 12 includes a lip 36 which interlocks with lip 34 of locking ring 20 to hold threaded telescope coupling 12 in position with respect to body 11. The locking ring 20 includes an annular recessed area 35, together with the resulting lip 33, to provide a groove to lock it in position. A set screw 83 threaded through body 11 fits into annular recess 35 of locking ring 20 to hold it in position. Cavity 30 inside body 11 communicates with hole 28 in connector 21 and hole 29 in locking ring 20 to provide a clear viewing path from adapter 21 to threaded telescope coupling 12 when tiltable mirror 18 is in an "up" position as shown in solid lines. Tiltable mirror 18 is mounted in a mirror holder 47, which can be constructed of plastic or any other acceptable construction material, and is secured to and held in position on extension 17 of connector 45 by means of attaching means such as set screws 46, which extend through threaded holes in mirror holder 47 and lock against extension 17. Connector 45 has a hole therein and is positioned and held in position on rod 19 by locking means such as set screw 84, which is threaded into connector 45 to intersect with and lock connector 45 to rod 19. The tiltable mirror 18 is shown in solid lines in an "up" position, which is the position assumed during actual photography with a camera attached to adapter 21. However, when an operator desires to view through hole 27 along axis B, the operator can tilt tiltable mirror 18 to a "down" position as shown in dashed lines so that it is at a substantially 45-degree angle with respect to axis A. The operator can then view through ocular 16 of FIG. 1 and through a telescope attached to threaded telescope coupling 12. The mechanism utilized to hold tiltable mirror 18 in position is shown i greater detail in FIGS. 3 and 4 of the drawings.

Figure 3:
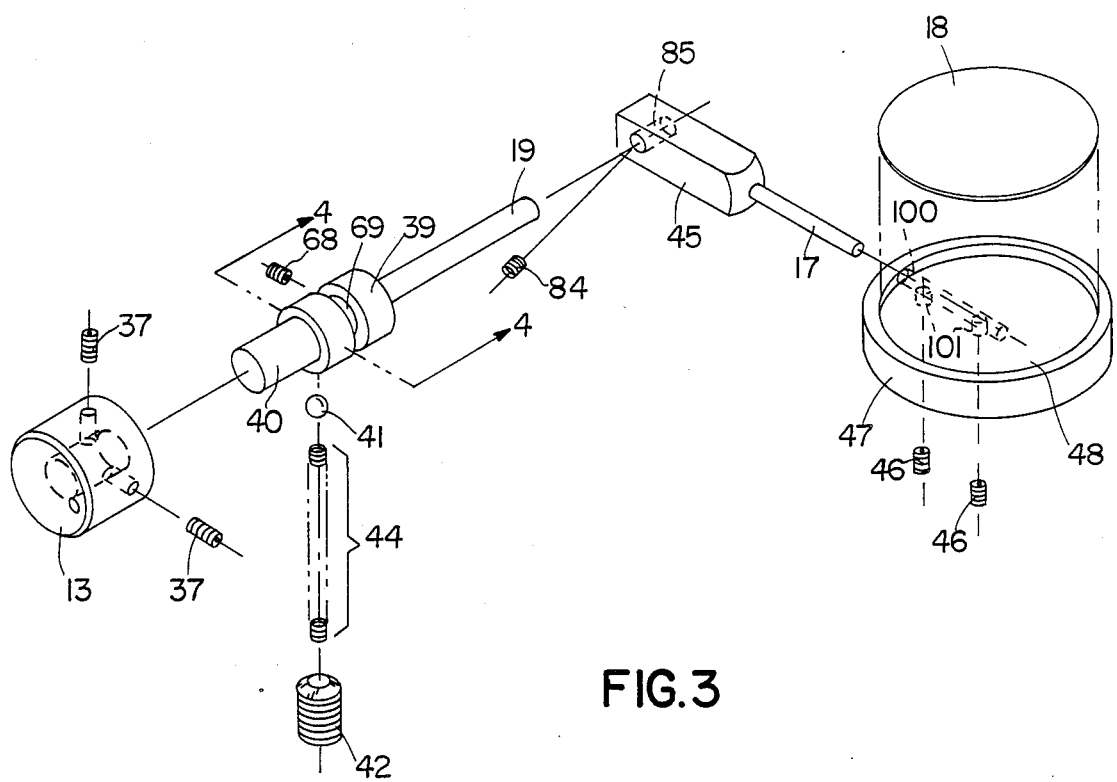
FIG. 3 is an assembly view of the photovisual star diagonal showing the construction of the tiltable mirror which provides alternative viewing paths.

FIG. 3 of the drawings is an assembly view of the mechanism utilized in operating tiltable mirror 18. Tiltable mirror 18 is positioned in a mirror holder 47 having a recessed area 48 into which tiltable mirror 18 fits. Tiltable mirror 18 can be attached to mirror holder 47 by means of glue or any other acceptable attaching means. Extension 17 of connector 45 extends through hole 100 in mirror holder 47, and mirror holder 47 is attached to extension 17 by means of set screws 46, which extend through threaded holes 101 in mirror holder 47 and lock against extension 17 to hold mirror holder 47 in position. Connector 45 includes a hole 85 positioned therein of proper size to accept rod 19. Once rod 19 is positioned inside hole 85, connector 45 is locked in position on rod 19 by means of set screw 84, which is threaded through connector 45. Rod 19 includes an enlarged section 39, which has an annular recessed area 69. When locking screw 68, which is threaded through body 11, is tightened, it prevents rod 19 and enlarged section 39 from moving laterally. A knob shaft 40 is positioned on the opposite side of enlarged section 39 to allow connection of knob 13 thereto. Knob 13 is held in position by means of screws 37, which lock against knob shaft 40.

Figure 4:
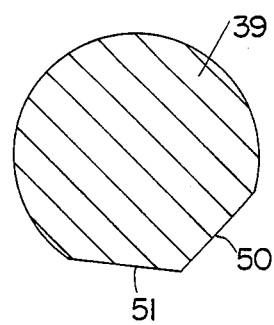
FIG. 4 is a cross-sectional view of the enlarged section 39 of rod 19 taken along lines 4—4 of FIG. 3

FIG. 4 is a cross-sectional view of enlarged section 39 taken along lines 4—4 of FIG. 3. There are two flat areas 50 and 51 positioned around the periphery of enlarged section 39 as shown. The angle of flat area 51 with respect to flat area 50 is such that, when set screw 42 is tightened against springs 44 and tension ball 41, the tension thereby created against flat area 50 and/or 51 holds tiltable mirror 18 in the position shown in solid lines in FIG. 2 or the position shown in FIG. 5 of the drawings is a block diagram showing the photovisual star diagonal 10 positioned between a telescope and a camera for positive projection. The photovisual star diagonal 10 is shown attached to a telescope 52 by telescope coupling 12 and telescope coupling 57, to a camera 53 by means of extension 58, T-ring 56, extension 58 and adapters 61 and 21. The ocular 54, which in this embodiment is positioned inside extension 58 at the end of adapter 61, acts as a projector for projecting a magnified image to the film plane of camera 53. An ocular 16 is positioned and attached to photovisual star diagonal by adapter 15 to provide the alternative viewing path for sighting constellations or other subject matter to be photographed.

FIG. 6 is a block diagram illustrating photovisual star diagonal 10 in position utilizing a telescope at one end and a guider, compressor and camera at the opposite end to provide an off-axis guide system for use in wide-angle deep-sky photography. When utilized in this mode, the telescope 52 is attached to photovisual star diagonal 10 by telescope coupling 57 and telescope coupling 12. Camera 53 is attached to compressor lens 60 by T-ring 56. Compressor lens 60 is coupled to guider 59, which is in turn coupled to photovisual star diagonal 10 by attachment to adapter 21. Guider 59, which is positioned between photovisual star diagonal 10 and camera 53, includes a coupling 62 and the appropriate extension tube 14, together with an appropriate ocular 16, to provide an off-axis guidance system so that, when viewing through ocular 16 and guider 59, an individual utilizing the system can guide on a specific star positioned near the edge of the field of view. By utilizing the proper number of extension tubes 14, together with proper oculars 16, the operator can parfocalize the visual images at ocular 16 of photovisual star diagonal 10 and at ocular 16 of guider 59 with the image reaching camera 53, and can therefore shift the field of view to photograph other subject matter without being required to refocus each of the individual sight paths.

FIG. 7 of the drawings is an illustration of photovisual star diagonal 10 utilized in a prime field of view at the camera 53 than at photovisual star diagonal 10. This prime focus arrangement is utilized to ensure that the primary object and the immediately surrounding area are covered. In the prime focus arrangement, the telescope 52 is attached to photovisual star diagonal 10 by telescope couplings 57 and 12. Camera 53 is attached to photovisual star diagonal 10 by means of T-ring 56 and adapters 21 and 61. Extension tube 14 is attached to coupling 15 of photovisual star diagonal 10, and ocular 16 is coupled to extension tube 14. Once the visual image at ocular 16 and the image at camera 53 are parfocalized, an individual can shift the field of view to photograph different objects in the sky with minor refocusing of telescope 52.

FIG. 8 illustrates the photovisual star diagonal 10 utilized to provide dual-power viewing. In this arrangement telescope 52 is attached to photovisual star diagonal 10 by means of telescope couplings 12 and 57, and a star diagonal 55 or other coupling, together with an ocular 16, is attached to photovisual star diagonal 10 by means of adapter 21. By properly selecting oculars 16 utilized with photovisual star diagonal 10 and the star diagonal 55, and by selecting the proper number of extension tubes 14, an individual can utilize the photovisual star diagonal 10 to provide dual-power viewing, and can thus use the lower power magnifications for sighting a specific star or constellation, thereafter shifting to the higher magnification path to gain more detail without having to disturb the arrangement of oculars 16.

Figure 9:
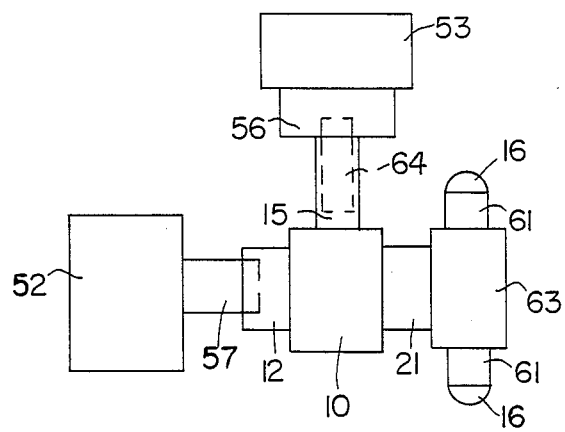
FIG. 9 is a block diagram showing the telescope attached to the photovisual star diagonal with a camera attached thereto by a Newtonian adapter, as well as a rotary holder to provide a multi-photovisual arrangement.

FIG. 9 of the drawings illustrates use of photovisual star diagonal 10, together with a rotary holder 63 and Newtonian adapter 65, to provide multiple-power viewing, as well as a viewing path through which a camera can take pictures. In this particular arrangement, telescope 52 is attached to photovisual star diagonal 10 by telescope couplings 12 and 57, but camera 53 is attached to coupling 15 of photovisual star diagonal 10 by means of a Newtonian adapter 64 and T-ring 56 so that camera 53 can be used when the tiltable mirror 18 is adjusted to provide viewing through coupling 15 of photovisual star diagonal 10. A rotary holder 63 is attached to photovisual star diagonal 10 by adapter 21 and provides adapters 61 by which oculars 16 can be attached to rotary holder 63. With the use of the proper ocular 16 with rotary holder 63, multiple-power viewing can be achieved therethrough which allows the use of a lower-power ocular 16 for basic sighting and a higher-power ocular 16 for fine-sighting the telescope 52 prior to the use of the camera 53.

Figure 10:
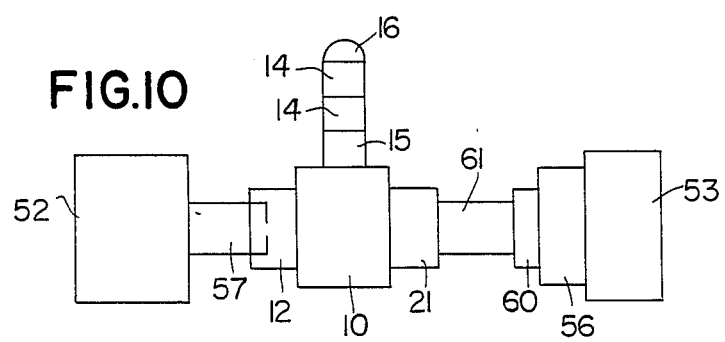
FIG. 10 is a block diagram of the photovisual star diagonal positioned in a telescope and a camera utilizing a compressor lens for a wide-angle shots in the prime focus arrangement.

FIG. 10 of the drawings is an illustration of photovisual star diagonal 10 in position with a telescope 52, camera 53 and compressor 60 arranged to facilitate wide-angle shots in a prime focus arrangement. In this arrangement, multiple extension tubes 14 are utilized together with the proper ocular 16 to facilitate parfocalization of the visual image at ocular 16 and the photographic image at camera 53. A compressor lens 60 is utilized to reduce the magnification at camera 53, thereby providing wider-angle shots than would otherwise be available.

Figure 11:
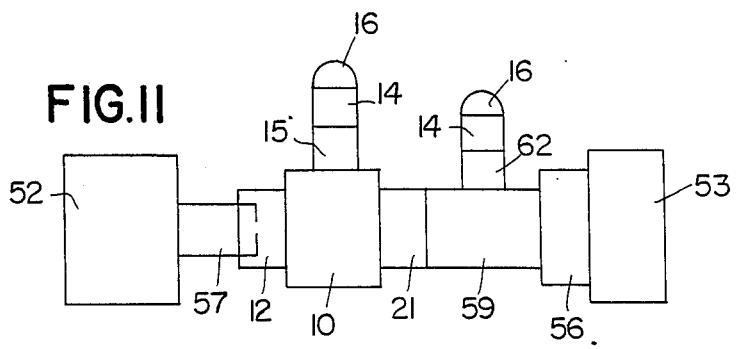
FIG. 11 is a block diagram showing the photovisual star diagonal positioned between a telescope and a camera and including a guider to provide off-axis modes for use in deep-sky photography.

FIG. 11 illustrates the photovisual star diagonal 10 utilized with a guider to provide off-axis modes for use in deep-sky photography. More specifically, viewing of the entire field of view is provided through ocular 16, coupling 15 and photovisual star diagonal 10 to telescope 52, but sighting through ocular 16, adapter 62 and guider 59 allows an individual to guide on a specific star at the edge of the field of view. This facilitates fine control of the positioning of the telescope 52 to provide high-quality deep-sky photography, while still allowing the operator to examine the field of view periodically through the ocular 16 and coupling 15 of photovisual star diagonal 10

While the foregoing description of the invention has shown preferred embodiments using specific terms, such description is presented for illustrative purposes only. It is applicant's intention that changes and variations may be made without departure from the spirit or scope of the following claims, and this disclosure is not intended to limit applicant's protection in any way.

I claim:

1. A photovisual star diagonal for use with telescopes to simplify astrophotography, comprising:
   a body having:
     a front end;
     a rear end;
     a top, and
     a cavity extending from said front end to said rear end of said body and through said top of said body;
   first coupling means positioned near said front end of said body for attaching a first optical device thereto for viewing through said cavity of said body along a first axis;
   second coupling means positioned near said rear end of said body for attaching a second optical device thereto and orienting said second optical device for viewing along said first axis;
   third coupling means positioned near said top of said body oriented substantially perpendicularly to said first and second coupling means for attaching a third optical device thereto for viewing through said top of said body into said cavity of said body along a second axis oriented substantially perpendicularly to said first axis;
   first adjustment means for adjusting the distance between said third optical device and said first axis;
   a multi-position mirror positioned inside said cavity in said body and oriented so that when said mirror is in a first position, viewing from said first optical device to said second optical device is substantially unimpaired, and when said mirror is in a second position, a viewing path is established between said third optical device and said first optical device;

control means for changing the position of said multi-position mirror from said first position to said second position and from said second position to said first position consisting of a rod to which said multi-position mirror is attached which has at least two flattened areas and a knob to facilitate adjustment of said multi-position mirror;

locking means for holding said multi-purpose mirror in said first position and in said second position consisting substantially of a spring-loaded contact which contacts one of said two flattened areas;

second adjusting means for adjusting the position of said multi-position mirror with respect to said first axis, and third adjusting means for adjusting the orientation of said multi-position mirror with respect to said second axis.

* * * * *

UNITED STATES PATENT AND TRADEMARK OFFICE
CERTIFICATE OF CORRECTION

PATENT NO. : 4,930,883

DATED : JUNE 5, 1990

INVENTOR(S) : RONALD H. SALZMAN

It is certified that error appears in the above-identified patent and that said Letters Patent is hereby corrected as shown below:

In column 4, line 15, please delete "i" and substitute --in--.

In column 4, line 49, after "shown in" please insert -- dashed lines in FIGURE 2 of the drawings.--.

Signed and Sealed this

Fifth Day of May, 1992

*Attest:*

DOUGLAS B. COMER

*Attesting Officer*  *Acting Commissioner of Patents and Trademarks*